United States Patent [19]
Ralston et al.

[11] 3,811,955
[45] May 21, 1974

[54] HIGH DISCHARGE RATE MERCURY CELL

[75] Inventors: Robert E. Ralston, Spring Valley; Yung Ling Ko, Peekskill, both of N.Y.

[73] Assignee: P. R. Mallory & Co., Inc., Indianapolis, Ind.

[22] Filed: Aug. 7, 1972

[21] Appl. No.: 279,107

Related U.S. Application Data

[63] Continuation-in-part of Ser. No. 777,773, Nov. 21, 1968, abandoned.

[52] U.S. Cl. ............................... 136/107, 136/179
[51] Int. Cl. ......................................... H01m 21/00
[58] Field of Search ............ 136/179, 166, 175, 107, 136/95, 102, 13–14, 108–109, 128, 181, 125, 30, 3, 162

[56] References Cited
UNITED STATES PATENTS

| | | | |
|---|---|---|---|
| 3,156,585 | 11/1964 | Yamano et al. | 136/6 |
| 3,377,201 | 4/1968 | Wagner et al. | 136/13 |
| 1,269,162 | 6/1918 | Crowdus | 136/162 |

FOREIGN PATENTS OR APPLICATIONS

| | | | |
|---|---|---|---|
| 544,627 | 6/1922 | France | 136/179 |
| 17,269 | 11/1895 | Great Britain | 136/179 |

*Primary Examiner*—Anthony Skapars
*Attorney, Agent, or Firm*—Robert Levine

[57] ABSTRACT

The present invention provides a primary battery for high current loads. In order to fulfill the electrochemical parameters for giving high current discharge, it is necessary that the electrode area be increased extensively. Provision is thus made for compensating for gas evolution within the battery by including a pressure gradient device within said battery. This device is incorporated within a large void space within the battery and comprises an electrolyte dispenser in combination with a flexible, unperforated tube having a sealed end and an open end. The open end is closed by means of an electrolyte dispenser comprising a tight-fitting plastic cap having an aperture therethrough. This pressure gradient device is disposed concentrically within the cell, generally within one of the inner conductors of the cell, such as the anode conductor.

2 Claims, 2 Drawing Figures

PATENTED MAY 21 1974

3,811,955

INVENTORS
ROBERT E. RALSTON
YUNG LING KO
BY
ATTORNEY

HIGH DISCHARGE RATE MERCURY CELL

This is a continuation-in-part of U.S. Ser. No. 777,773, filed Nov. 21, 1968, now abandoned.

This is a continuation-in-part of U.S. Ser. No. 777,773, filed Nov. 21, 1968, now abandoned.

Primary cells are electrochemical devices from which stored chemical energy is converted directly into electrical energy by an electrochemical process. Generally, primary cells refer to those that do not have efficient reversible chemical reaction and are not reusable or rechargeable. Once a primary chemical cell is converted into electrical action, the battery is usually discarded.

It has been found that problems exist in constructing primary cells and/or batteries needed for high current loads. Such primary cell output depends on increasing electrode surface areas. Since current density is determined by the current output in ratio to surface area, the larger the surface area present, the lower will be the current density required for high discharged current, especially at reduced temperatures. It is also required for certain applications that a rugged construction be afforded, such that the cell is capable of meeting extreme physical shock requirements in the order of 10,000 gs.

The present invention obtains the increased surface area and discharge capacity capability by constructing two cylindrical electrode cells and placing one inside the other. The positive electrodes are connected together by welding the containers at the bottom. The other conductors both make contact to the cell top thereby connecting both negative electrodes together. The structure thus obtained can be considered to be a double cell or two cells in parallel with a common electrolyte for the cells in the same container.

However, because of known gas evolution characteristics of zinc electrodes in alkaline electrolytes, it is necessary to provide means for minimizing the effects of said gas evolution in the battery construction.

The prior art, as evidenced by French Pat. No. 544,627, and U.S. Pat. Nos. 3,156,585 and 3,377,201 made no provision for including compensatory means within the disclosed batteries to regulate excessive gas evolution within the batteries and to essentially confine the evolved gas within these batteries.

While French Pat. No. 544,627 incorporates a compressible gas reservoir within a void space in the battery, the entire concept is directed to an elastic membrane closing the reservoir which is open to the external atmosphere.

U.S. Pat. No. 3,156,585 shows concentrically disposed electrodes in which the innermost electrode is a hollow cylinder having a perforated resilient sleeve to provide for the gas diffusion necessary for the reactional consumption of internally generated gas.

Finally, U.S. Pat. No. 3,377,201 merely shows a hermetically sealed battery having a hollow perforated metallic core, serving as one terminal of the battery, with one or more electrode packs spirally wound thereabout.

Thus the teachings of the prior art are antithetical to those of the present invention in which an electrically non-conductive compensatory device is utilized to regulate the gas evolved during the operation of comparatively large cells and to further confine this evolved gas within the battery.

In large cells, such as those contemplated by the present invention in which the zinc content may approach 120 grams, the gas problem becomes more extreme. Consideration of other factors influencing gas evolution are zinc surface area and the porosity of the structure in general. These are extremely important to consider in order to obtain high discharge rates at low temperature. It is a fact that internal pressure increase due to gas evolution is a function of the void space in the cell; for example, 2 cc of evolved gas in a void space of 1 cc will produce a pressure of approximately 28 psi. Therefore, maximum void space without a decrease of output volume efficiency is desirable. This has been accomplished in the present invention by incorporating a pressure-gradient device into the battery as will be described hereinafter.

It is a prime object of this invention to provide a cell with increased electrode surface area capable of being used at a low temperature.

It is a further object of the present invention to provide an electrochemical cell which will compensate for internal pressure due to gas evolution in the cell.

A further object is to provide an improved duality of chemical assemblies which may be employed to obtain an unitarily acting primary cell.

Other objects will become apparent as the description proceeds.

Figures 1, 2:
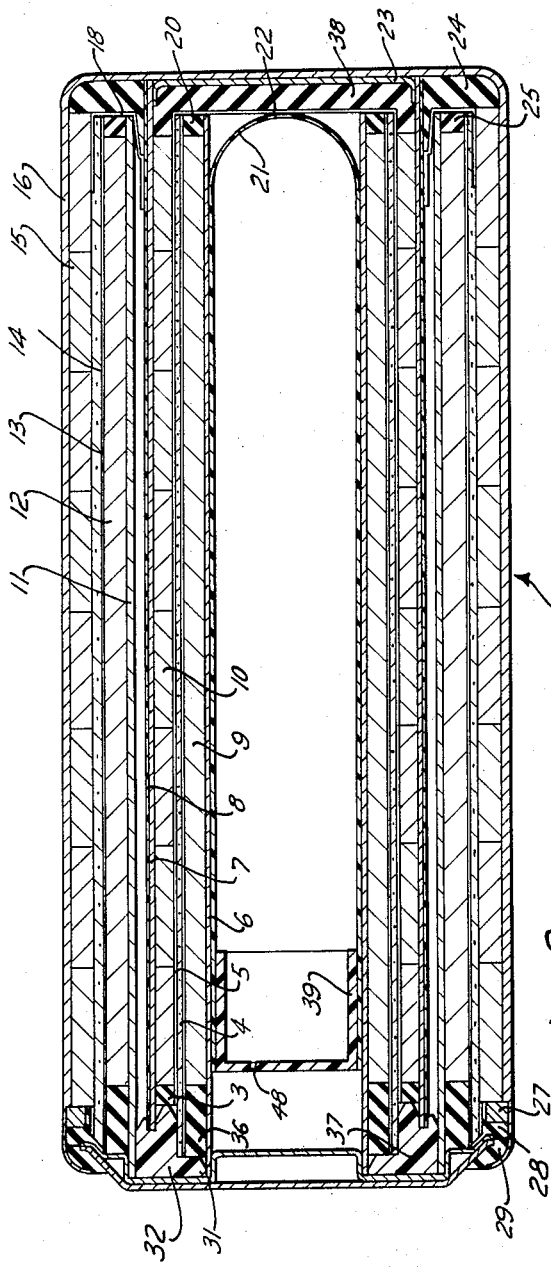
FIG. 1 is a top view of an embodiment of the primary cell of the invention, providing a construction affording increased electrode area.
FIG. 2 is a cross-sectional vertical view of the primary cell as shown taken along line 2—2 in FIG. 1 and depicting the double electrode construction of the cell, and wherein maximum void space is provided to compensate for internal gas evolution.

Generally speaking, the present invention provides a primary cell for high current loads. In order to fulfill the electrochemical parameters for giving high current discharge, it is necessary that the electrode area be increased extensively. Thus it becomes necessary that provision be made for controlling the effects of any gas evolution that may result from the operation of the extended area zinc electrode immersed in an alkaline electrolyte. The cell, therefore, contains a large void space without sacrificing performance by incorporating therewithin an electrolyte dispenser in combination with flexible plastic means. The flexible plastic means comprise an electrically non-conductive plastic tube disposed concentrically within the battery, generally within one of the inner conductors of the battery, in this case, the anode conductor. The electrolyte dispenser will be described infra.

As previously stated, increased surface area and discharge capacity capability is obtained by interfitting a plurality of cylindrical cells. Each cell contains a plurality of electrodes and can be considered in construction to be a double cell or two cells connected in parallel. The cells will thus have inner and outer anode conductors. The void space comprises a flexible plastic tube placed within the inner cell anode conductor. The tube is an unperforated, thin-walled, flexible member fabricated of polypropylene shaped in the manner of a test tube. Its open end is closed by a means of a tight fitting plastic cap which has a small bore passing therethrough. This plastic cap serves as an electrolyte dispenser and allows pressure equalization within the tube as it may be compressed upon the generation of gas in the cell. The tube, which serves as a compressible gas reservoir, also displaces the electrolyte into the areas between the electrodes necessary for the discharge reaction to generate electrical energy.

The electrolyte dispenser works in the following manner:

The small aperture in the cap, while minimizing the tendency for the electrolyte to fill the plastic tube, does allow the electrolyte to flow both into and out of the plastic tube. This may occur, for example, when the battery is lying on its side or when it is standing inverted. The electrolyte that is thus permitted to enter the tube is then dispensed through said aperture in the plastic cap.

Referring to the drawings, in FIG. 1 it is seen that the inner and outer components form complete interconnected cells to form an unitary assembly 30. In FIG. 2 it is seen that the inner cell comprises an inner cell steel tubing 7, and a Teflon$^R$ coating 8 placed thereon. Centrally disposed within the cell, is a flexible polypropylene tube 21 whose function is to act as a reservoir of compressible gas as well as an electrolyte displacer. Adjacent to tube 21 is, in sequence, the inner cell anode conductor 6, the anode 9, an absorbent member 4, a porous barrier 5 and the inner cell depolarizer 10. The inner cell depolarizer is contained between the inner cell steel tubing and the inner anode conductor 6.

The outer cell comprises an outer cell anode conductor 11, anode 12, and absorbent 13, porous barrier 14, the outer cell depolarizer 15 and an outer steel can 16. As indicated, means are used to electrically insulate the components of the cell whenever necessary. Thus, the construction utilizes polyethylene insulators 18, 22; rubber rings 24, 25, 20 and a rubber cup 38. There is also provided for sealing the cell a molded rubber grommet 28, metal ring 27, rubber rings 36, 37 and a plastic support 32. It is to be noted that the electrolyte dispenser flexible cap 39, has an aperture 48 placed therethrough to allow for variation of pressure within the tube 21 when gas is evolved in the cell.

It is seen that the inner cell anode conductor 6 and the outer cell anode conductor 11 make contact with inner cell top 31 and the outer cell top 29 through a double cell top construction. In a similar fashion, the inner and outer cell depolarizers 10, 15 are interconnected through tubing 7 and can 16 by means of an adapter cup 23.

A rugged construction for the cell is thus afforded whereby the cell is capable of withstanding great shock through the utilization of proper supports such as plastic support 32 which is placed beneath the double top and is mounted on the rubber ring construction 3 and 36.

Various modifications are contemplated and may obviously be resorted to by those skilled in the art without departing from the spirit and scope of this invention.

What is claimed is:

1. An alkaline primary battery comprising:

a plurality of concentrically arranged interfitting individual cells, each of said cells comprising respectively an anode, a depolarizer cathode, and an activating electrolyte therebetween, each anode of said individual cells being electrically interconnected and each cathode of said individual cells being electrically interconnected to afford extensive surface areas to be acted upon by said electrolyte whereby a high current output is obtained from the battery;

gas control means for controlling the internal gas pressure of said cells comprising a flexible, electrically non-conductive plastic tube having an open end and a closed end, said tube acting as an electrolyte displacer and as a reservoir of compressible gas, said gas being solely confined within said battery;

an electrolyte dispenser closing said open end of said plastic tube, said dispenser comprising a tight-fitting plastic cap having a small bore therethrough to allow pressure equalization within said tube as said tube becomes compressed upon the generation of gas within said battery.

2. The battery of claim 1 wherein each of said anodes is fabricated of zinc and said flexible plastic tube is centrally disposed within said battery.

* * * * *